United States Patent [19]

Kikuchi

[11] Patent Number: 4,794,601
[45] Date of Patent: Dec. 27, 1988

[54] HIGH-RELIABILITY COMPUTER SYSTEM

[75] Inventor: Toshio Kikuchi, Tokyo, Japan

[73] Assignee: NEC Corporation, Japan

[21] Appl. No.: 944,806

[22] Filed: Dec. 19, 1986

[30] Foreign Application Priority Data

Dec. 24, 1985 [JP] Japan ................. 60-295590

[51] Int. Cl.⁴ ............................. G06F 11/00
[52] U.S. Cl. ............................. 371/36; 371/37
[58] Field of Search ............. 371/37, 3, 36, 9, 45, 371/10, 38, 7, 39, 11

[56] References Cited

U.S. PATENT DOCUMENTS

| | | | |
|---|---|---|---|
| 3,863,215 | 1/1975 | McGrogan | 371/36 |
| 4,375,683 | 3/1983 | Wensky | 371/36 |
| 4,536,878 | 8/1985 | Rattlingourd | 371/37 |
| 4,569,050 | 2/1986 | Ohme | 371/37 |
| 4,667,327 | 5/1987 | Bright | 371/45 |
| 4,675,868 | 6/1987 | Shishikura | 371/36 |

Primary Examiner—Michael R. Fleming
Attorney, Agent, or Firm—Ostrolenk, Faber, Gerb & Soffen

[57] ABSTRACT

A high-reliability computer system is provided in which error correcting codes are preliminarily added to the signals to be applied to a voter from a plurality of computers by error correcting code encoders so that, even if an error resulting from a failure of the voter occurs, an error correcting code decoder can provide a correct result based on the error correcting codes, whereby a failure in the computers and error correcting code encoders can be avoided by means of the voter, a failure in the voter can be avoided by the error correcting code decoder, and a failure in the error correcting code decoder can be avoided by parallel redundancy arrangement.

9 Claims, 16 Drawing Sheets

Prior art technique

| S5 S4 S3 \ S2 S1 S0 | 0 | 1 | 2 | 3 | 4 | 5 | 6 | 7 |
|---|---|---|---|---|---|---|---|---|
| 0 | NO ERROR | P0 | P1 | U | P2 | U | U | i0 |
| 1 | P3 | U | U | i1 | U | i2 | i3 | U |
| 2 | P4 | U | U | i4 | U | i5 | i6 | U |
| 3 | U | i7 | i8 | U | i9 | U | U | i20 |
| 4 | P5 | U | U | i10 | U | i11 | i12 | U |
| 5 | U | i13 | i14 | U | i15 | U | U | i21 |
| 6 | U | i16 | i17 | U | i18 | U | U | i22 |
| 7 | i19 | U | U | i23 | U | i24 | i25 | U |

U : Uncorrectable error

FIG. 14

HIGH-RELIABILITY COMPUTER SYSTEM

BACKGROUND OF THE INVENTION

1. Field of the invention

The present invention relates to high-reliability computer systems comprising a plurality of computers with a redundancy arrangement on a voting basis.

2. Description of the Prior Art

Prior art high-reliability computer systems of the type referred to above are often used in such application that demand a high operational reliability, since, in the voting system, a failure in constituent elements of the computer system leads to no immediate failure of the overall computer system and the computer system operation is not interrupted by redundancy switching operation, software retry and the like.

Recently, an increased importance of the role of computers in rockets, space vehicles and the like demands the flight and/or interior control of such vehicles to be fully computerized. Accordingly, more and more large and ultra-large scale integrated circuits (LSI and ultra-LSI) with increased circuit integration or density are used rather than the conventional small and medium scale integrated circuits (SSI and MSI). The current technological study is directed to achieve higher function/performance and smaller dimensions/lower power consumption at the same time.

On the other hand, an LSI microprocessor has had a problem of such a so-called single event phenomenon that the LSI, when subjected to high energy of cosmic rays traveling in the cosmic space, loses information stored therein, thus disabling the operation of the LSI. Such single event phenomenon is said to take place once or so in a time period of from several hours to several months in probability, and varies depending on the strength of the LSI, frequency of actuation, etc.

Further, since computers have become the nucleus of space vehicles or the like, the failure or inoperability of the computer has become umpermissible or intolerable even if only momentary. In addition, it is impossible to repair such a faulty computer mounted on a space vehicle far away from the earth, and hence there has been studied such a high-reliability computer system that uses three or more computers on a voting basis.

However, this voting system, though having the aforementioned merits, has been disadvantageous in such applications that require a very high reliability as mentioned above, because the system also has the following disadvantages.

1. Failure of a voter leads to failure of the overall computer system.

2. When a voter with redundancy arrangement is used, it becomes necessary to switch over the faulty portion in case of a failure, which requires re-runining the software, usually causing the processing to become discontinuous.

SUMMARY OF THE INVENTION

An object of the present invention is, therefore, to provide a high-reliability computer system without the above-mentioned disadvantages in the prior art to achieve a very high reliability.

In accordance with the present invention, there is provided a high-reliability computer system comprising a plurality of computers and a voter connected to outputs of the plurality of computers for taking a vote on the outputs of the computers, characterized in that the system comprises error correcting code encoders connected between the outputs of the plurality of computers and the input of the voter for adding, to each of the output of the computers, error correcting codes, as well as an error correcting code decoder connected to the output of the voter for correcting errors in the output of the voter based on the error correcting codes.

In the present invention, signals applied to a voter are preliminarily subjected to error correcting code encoding at error correcting code encoders so that, even if an error resulting from failure of the voter occurs, an error correcting code decoder can provide a correct result based on the error correcting codes.

As a result, a failure in the computers and error correcting code encoders can be avoided by the voter, a failure in the voter can be avoided by the error correcting code decoder, and a failure in the error correcting code decoder can be avoided by parallel redundancy arrangement.

That is, means for avoiding failures in the constituent elements of the system are provided all as constituent elements. In this way, a very high reliability computer can be obtained that eliminates defects in prior art voting systems.

In the foregoing explanation, the computers constituting the system include any such devices having a computer function, such as a microcomputer, a microprocessor or the like. Further, the number of such computers may be two or more and preferably three or more, as necessary, in the computer system.

The voter may be of a known type but must be able to process bits in the number necessary for the voting operation. The arrangement of the voter itself is proposed as an example in Magazine "Nikkei Computer", an article entitled 'Fault Tolerant Computing' by Hideo Aiiso, pages 190–205, published on Oct. 5, 1981.

Further, the error correcting code encoder and decoder may be of a known type and may use the following codes in the error correcting code system.

| | Code Names | Reference Literatures |
|---|---|---|
| 1 | Extended Hamming Code (SEC-DED) | IBM Patent "Error Detecting and Correcting System", Japanese Patent Publication No. 20367/78; Hsiao, M.Y., "A Class of Optimal Minimum Odd-Weight-Column SEC-DED Codes", IBM Journal Res & Develop., Vol. 14 No. 4, Pages 395–401, 1975 |
| 2 | SEC-DED-SbED | A Paper reported by Fujiwara in the General Meeting of the Institute of Electronics and Communication Engineers of Japan, Information System Department, Lecture No. 365, October, 1979 |
| 3 | M-Code | A Paper reported by Matsuzawa in the Institute of Electronics and Communication Engineers of Japan, Technology Research Report by Electronic Computer Study Group, EC75-37, October, 1975 |
| 4 | BCH | A Paper Journal (D) of the Institute of Electronics and Communication Engineers of Japan, Vol. 60-D, No. 10, Pages 861–868, by Imai, October 1977 |
| 5 | SbEC | A Paper reported by Fujiwara in the Institute of Electronics of Japan, Technology Research Report by Electronic Computer |

| Code Names | Reference Literatures |
| --- | --- |
| | Study Group, EC77-2, February 1977 |
| 6 SbEC-DbED | Same as above; EC77-1, February 1977 |
| 7 SEC-SbED | Same as the above Item 2 |
| 8 Modified Fire Code | Magazine "Nikkei Electronics", Pages 209–219, October 25, 1982 |

Note:
SEC: single error correcting
DED: double error detecting
SbEC: single b-adjacent bit group EC
SbED: single b-adjacent bit group ED
DbED: double b-adjacent bit group ED The codes exemplified above are called random error correcting codes, and other codes such as burst error correcting codes, adjacent error correcting codes and so on may be arbitrarily used as necessary.

BRIEF DESCRIPTION OF THE DRAWINGS

FIG. 14 shows a logic matrix of a decoder in FIG. 13;

DESCRIPTION OF THE PREFERRED EMBODIMENTS

The present invention will be described in further detail with reference to the attached drawings.

Figure 3:
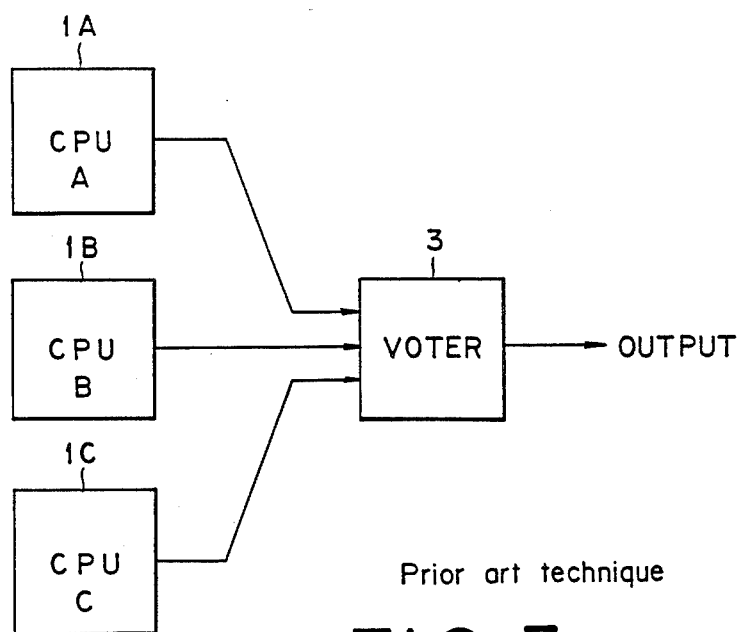
FIG. 3 is a block diagram showing an arrangement of a prior art system.

FIG. 3 is a block diagram showing of an arrangement of an example of prior art high-reliability computer systems, in which outputs of three computers 1A, 1B and 1C are applied to a voter 3 to take a vote thereon to prevent the failure of the system even when one of the three computers becomes faulty.

Figure 1:
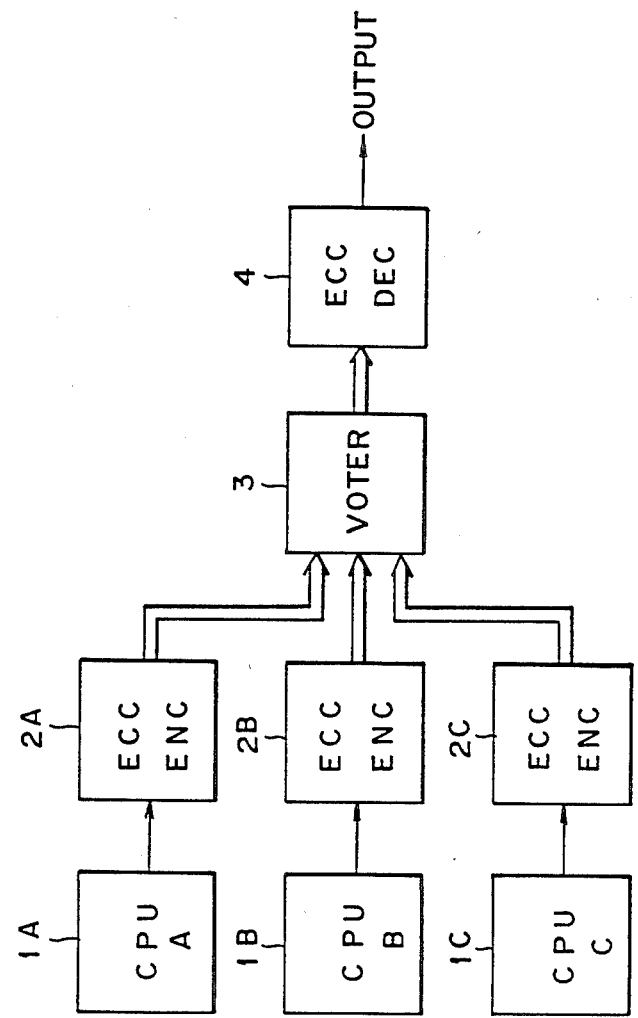
FIG. 1 is a block diagram showing an arrangement of a first embodiment of the present invention.

On the other hand, there is shown in FIG. 1 a block diagram of a basic arrangement of a high-reliability computer system according to the first embodiment of the present invention, which comprises three computers 1A, 1B and 1C, a voter 3 connected to outputs of the three computers to take a vote thereon, three error correcting code encoders 2A, 2B and 2C connecting outputs of the computers 1A, 1B, 1C and inputs of the voter 3 for adding error correcting codes to the outputs of the computers 1A, 1B, 1C respectively, and an error correcting code decoder 4 connected at its input to an output of the voter 3 for correcting the voter output error based on the above-mentioned error correcting codes.

Figure 2:
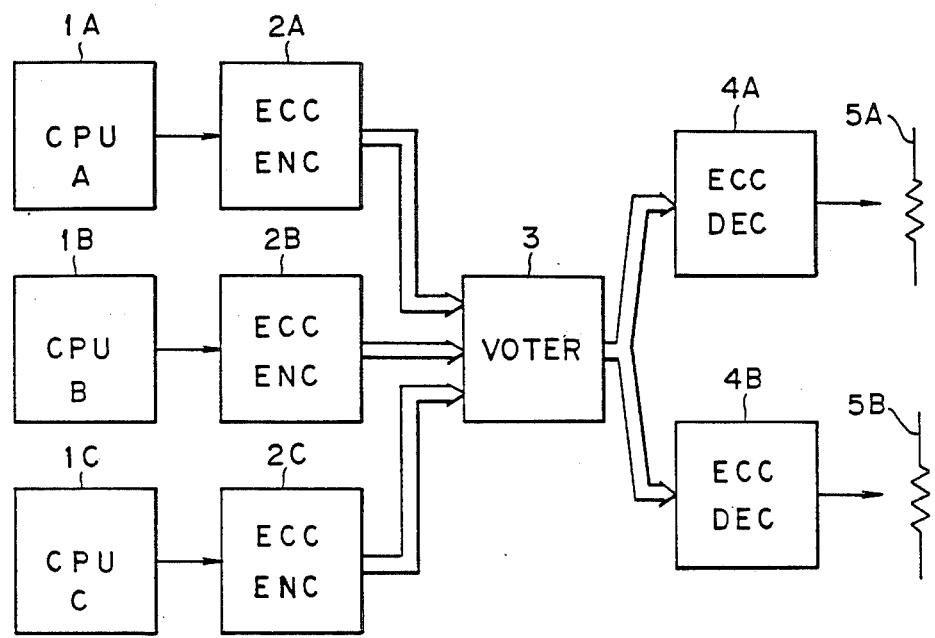
FIG. 2 is a block diagram showing an arrangement of a second embodiment of the present invention.

Shown in FIG. 2 is a block diagram of an arrangement of a second embodiment of the present invention, which embodiment is different from the first embodiment of FIG. 1 in that a voter 3 has two outputs connected respectively to two error correcting code decoders 4A and 4B. The outputs of the decoders 4A and 4B are connected to two actuators 5A and 5B, respectively. For simplification, hereinafter in this specification, computers 1A, 1B . . . , encoders 2A, 2B . . . , decoders 4A, 4B . . . , etc. may be referred to respectively as computers 1, encoders 2, decoders 4, etc.

A feature of the present invention is that there are provided the error correcting code encoders 2 and the error correcting code decoder(s) 4 in FIGS. 1 and 2.

Next, the operation of the embodiments will mainly be described in reference to the second embodiment. To each of the outputs of the computers 1 (each output consisting of a total 24 bits of 4 bits for control signal, 12 bits for I/O address and 8 bits for data) are added 6 bits (in the case of one error correcting and two error detecting codes) as an error correcting code by means of the corresponding one of the error correcting code encoders 2, and then the 30 bits in total are applied to the voter 3.

The voter 3 takes a vote on the 30-bit output of each of the computers 1 on a bit-by-bit basis, and sends the identical voting result to the two error correcting code decoders 4A and 4B. As a result, even when one of the computers 1 becomes faulty, that one can be eliminated on a voting basis, while the overall computer system can be kept normally operative. More specifically, the error correcting code decoders 4 correct an error resulting from the failure of the voter 3, etc. based on the error correcting code bits and send the corrected outputs to the actuators 5 which form input/output (I/O) devices of the computers 1.

When both systems of the error correcting code decoders 4 and actuators 5 are arranged to be of a parallel redundancy type, the arrangement allows the overall computer system to normally operate even in case of the failure of either decoder system, so that the overall computer system cannot be affected by a failure in that part and can operate normally.

| Failure Type | Site of Failure | Failure Avoiding Means |
| --- | --- | --- |
| 1 | Computer | Voter |
| 2 | Error Correcting Code Encoder | Voter |
| 3 | Voter | Error Correcting Code Decoder |
| 4 | Error Correcting Code Decorder | Parallel Redundancy of the other System |
| 5 | Actuator | Parallel Redundancy of the other System |

The above Table shows, in a summary, sites of failure and the corresponding failure avoiding means in the foregoing embodiments. In this way, in accordance with the present embodiment, a very high reliability computer system can be obtained.

The arrangement of memories in the respective computer (CPU) units and an input device can be properly determined according to the intended characteristics of the computer system. Examples of the arrangements are illustrated in FIGS. 4 to 7.

Figure 4:
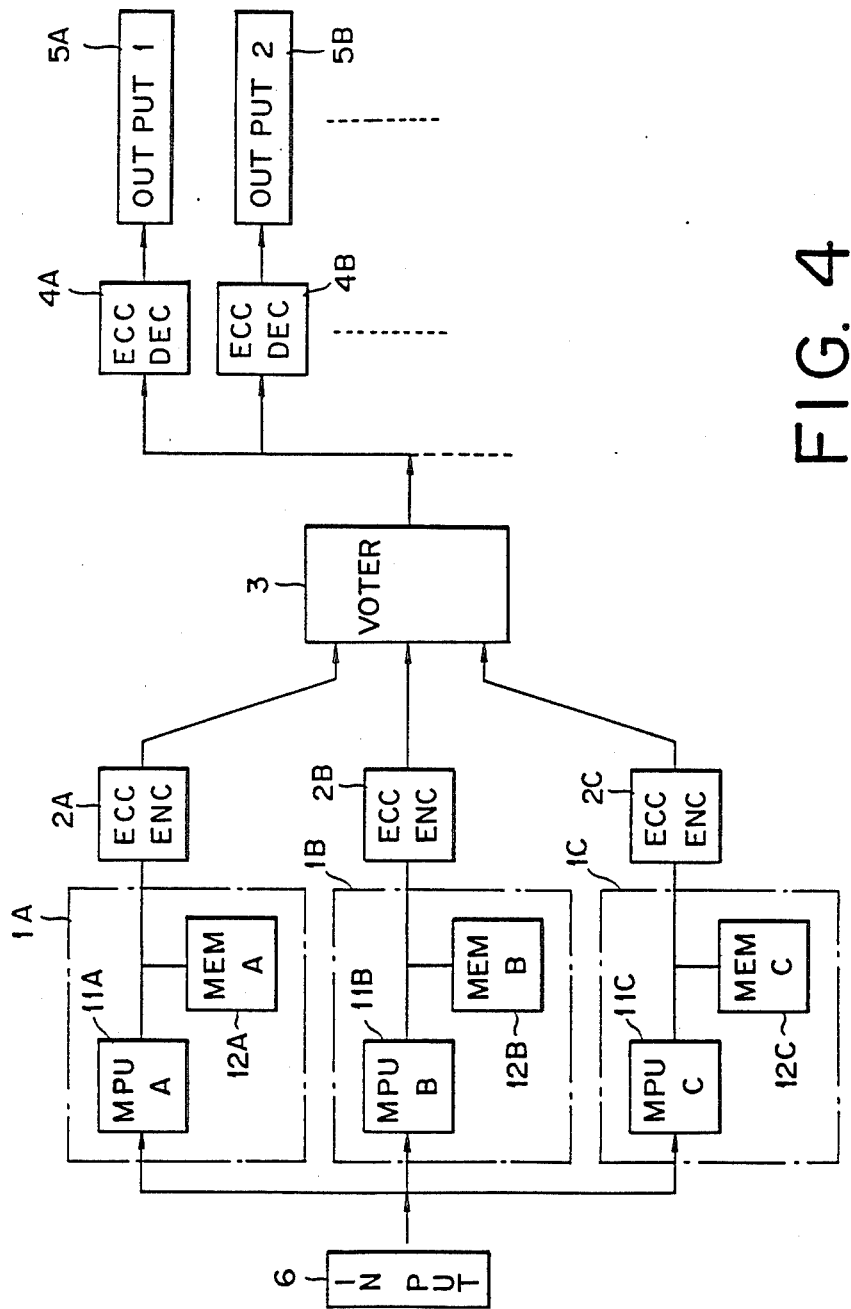
FIGS. 4 to 7 are block diagrams showing arrangements of different forms of the second embodiment of FIG. 2, which include memory(ies) and an input device located at different positions, respectively.

In the embodiment of FIG. 4, CPU units 1 are connected to an input device 6, each of which units has one of microprocessors 11 and one of memories 12. The CPU units 1 send their outputs through associated error correcting code encoders 2 to a voter 3 to take a vote on the outputs of the CPU units. The outputs of the voter 3 is applied to error correcting code decoders 4 to correct any error in the voter 3 and the outputs of the decoders 4 then are applied to associated output devices 5.

The present embodiment is effective for a system with a small scale of the memories 12, input device 6 and so on since it requires only the CPU units 1 as a two-way circuit section of the signal wire.

Figure 5:
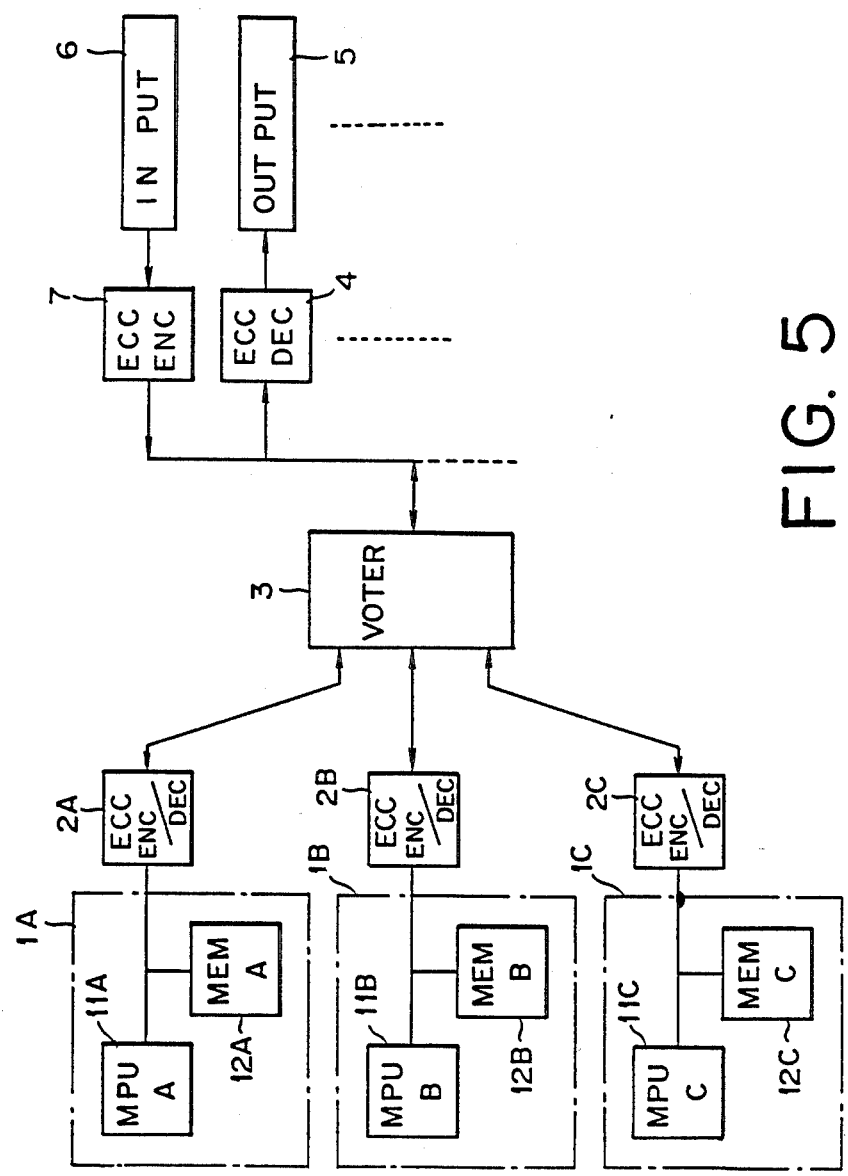

The embodiment of FIG. 5 is larger in scale of an input device and more complicated in control therein than the embodiment of FIG. 4, but it is an effective arrangement when only a small capacity of memory is required. In the embodiment of FIG. 5, input device 6 for the respective CPU units 1 is provided on the output side of a voter 3. Inputs from the input devices are responsive to the command signals from each microprocessor 11 and sent directly to the respective microprocessors 11 through the voter 3 without being subjected to any processing therein.

Figure 6:
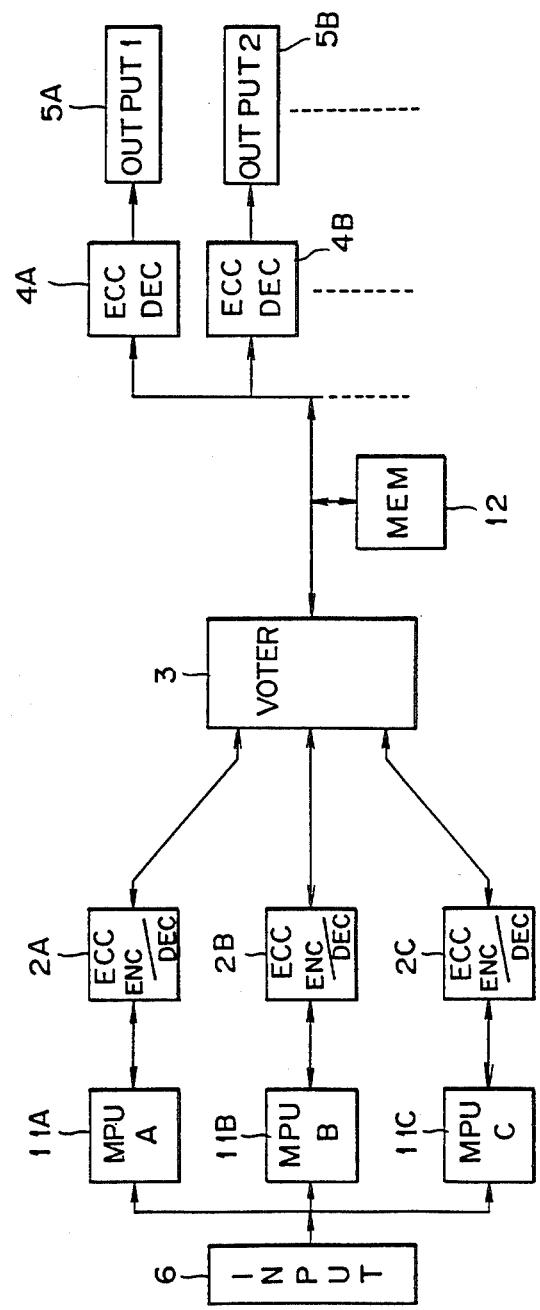
Figure 7:
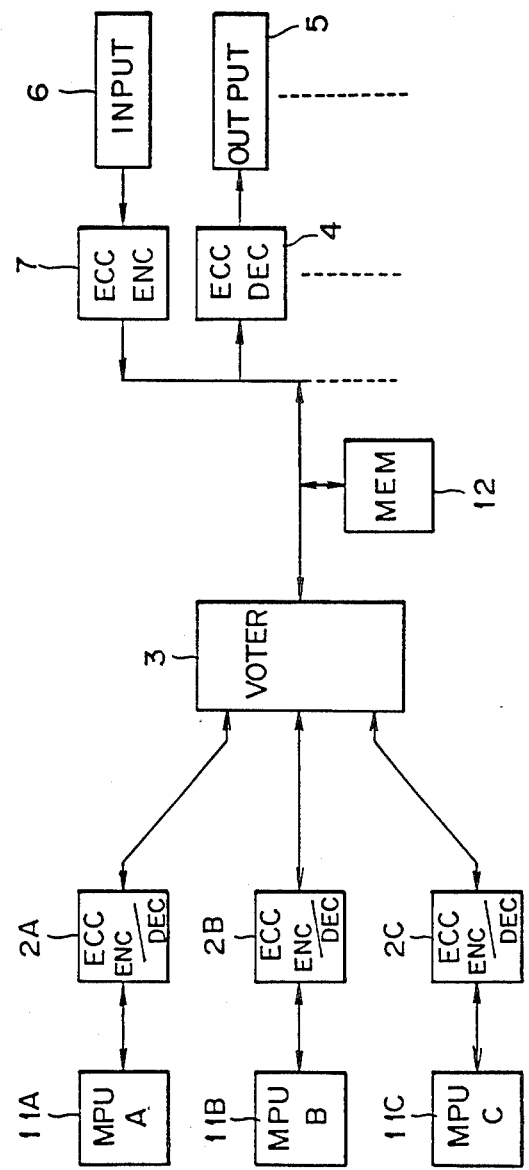

The embodiments of FIGS. 6 and 7 show systems to be applied when they are required to have a large capacity of memory compared with the case of the embodiments of FIGS. 4 and 5 and they have a difficulty in providing CPU units with the respective memories. In the embodiments shown in FIGS. 6 and 7, only a single memory 12 is required by providing it outside of computer units 1, i.e., at the output of a voter 3. Therefore, the embodiment of FIG. 6 is suitable in case where a small scale of input devices 6 and a large scale of memories 12 are necessary, whereas the embodiment of FIG. 7 is suitable in cases where the input device 6 and memory 12 must be both large in scale. A modified example of the embodiment in FIG. 7 is shown in FIG. 8 in detail.

Figure 8:
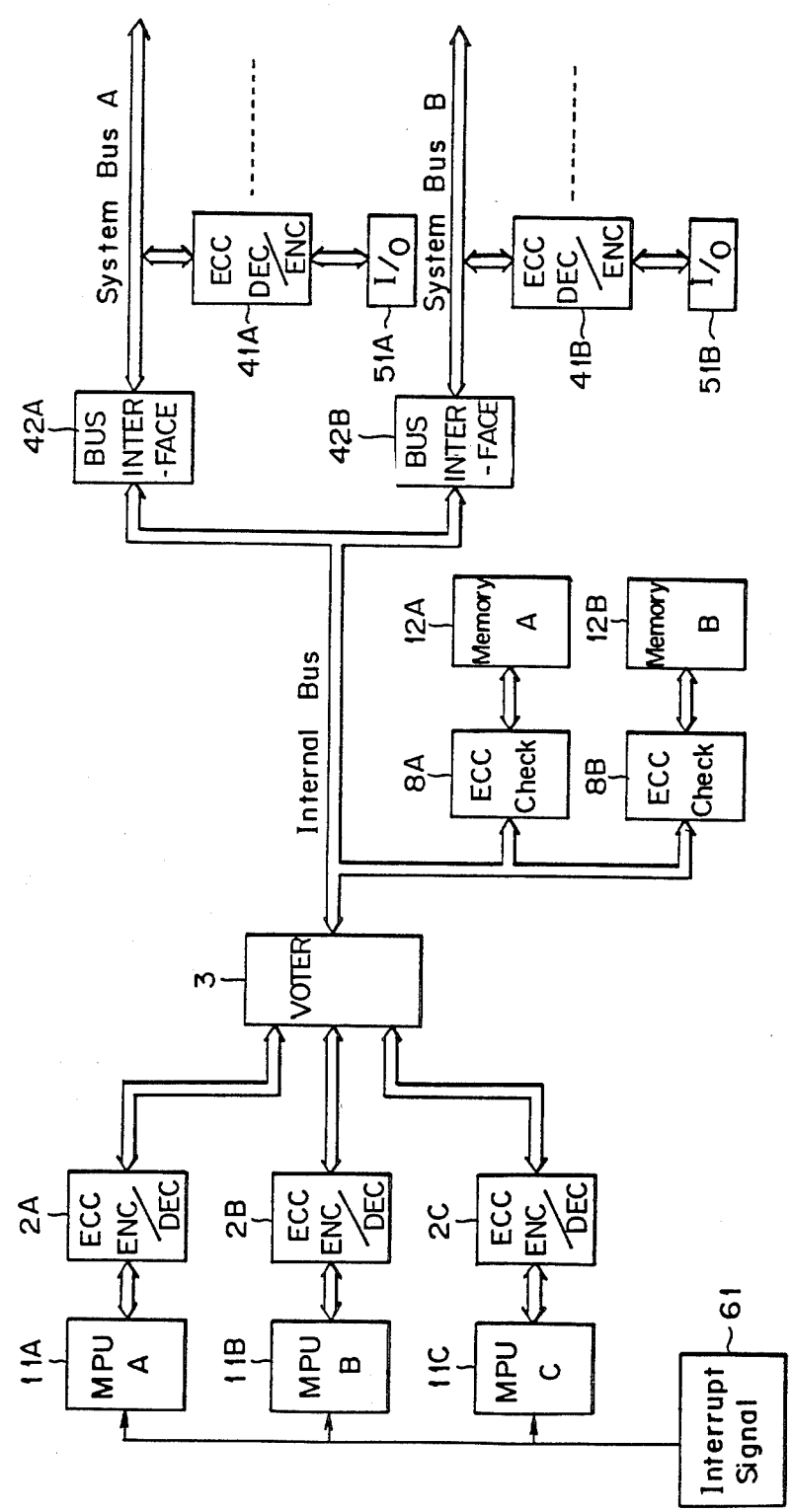
FIG. 8 is a block diagram showing a modified example of the arrangement of FIG. 7.

In FIG. 8, in addition to the arrangement of FIG. 7, an interrupt signal from a circuit 61, a pair of memories 12A and 12B and a pair of input/output devices 51A and 51B are provided. The pairs of memories 12A, 12B and I/O devices 51A and 51B provide a redundancy arrangement such that, even in case of a failure, the overall computer system can normally be operated and repair or the like on the failure part can be conducted during operation of the system without stopping the system.

The interrupt signal is applied to respective microprocessors (MPU's) 11 in parallel thereto and in accordance with the interrupt signal the input from the I/O devices 51A and 51B is outputted from MPU's 11 to error correcting code encoders and decoders 2.

Figure 9:
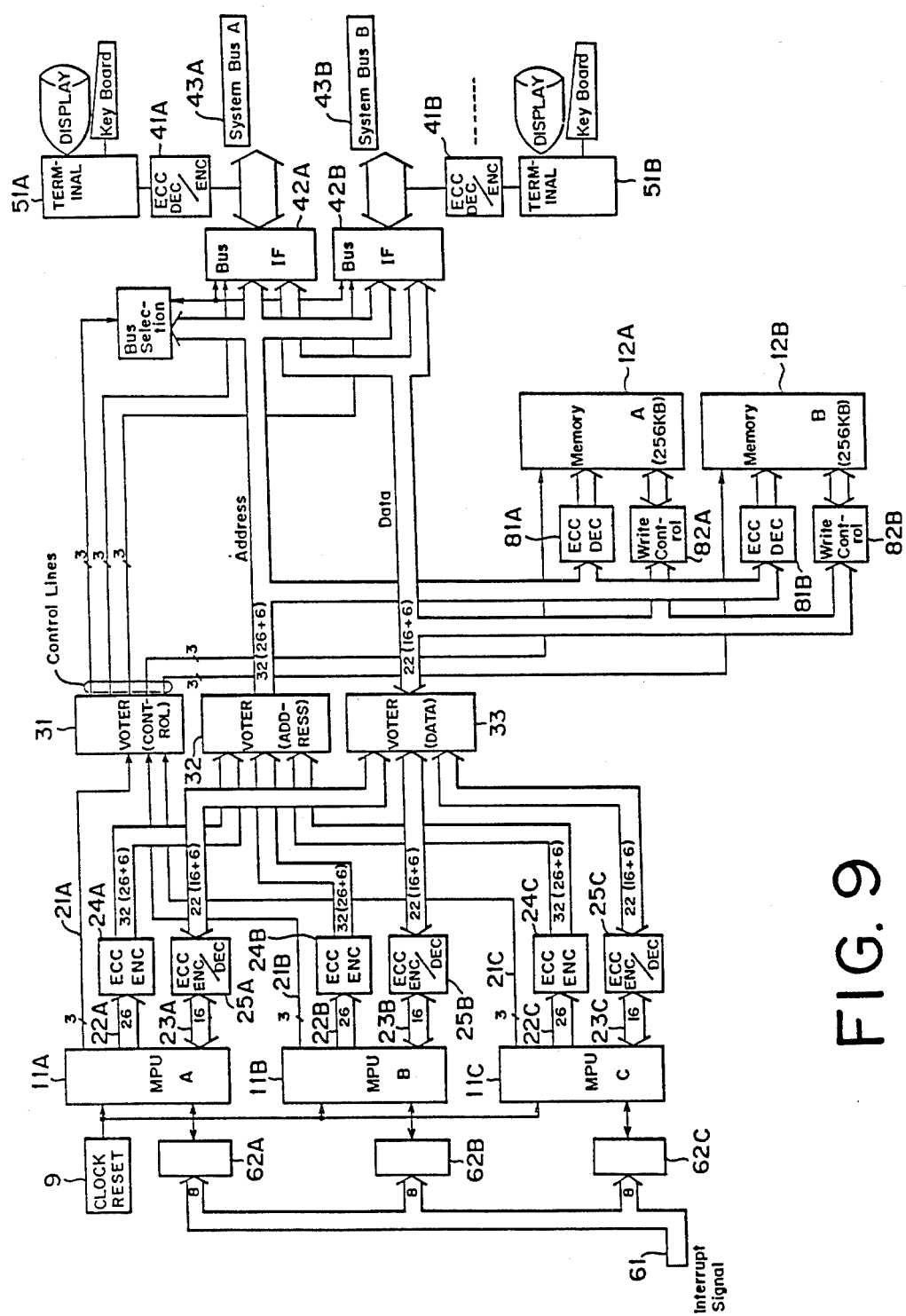
FIG. 9 shows a detailed block diagram of FIG. 8.

FIG. 9 is a detailed diagram of the arrangement of the control system of the embodiment shown in FIG. 8.

The operation of respective constituent parts of the embodiment shown in FIG. 9 will be explained according to flow of a signal.

(1) Clock and Reset Circuit 9

Identical clock and reset signals are applied to the respective microprocessor systems 11A, 11B and 11C to operate the three systems in complete synchronism with one another according to the clock signal.

(2) Interrupt control circuit 62

Interrupt control circuits 62 are provided for the associated microprocessors 11 to provide independent control over the microprocessor systems. In the illustrated embodiment, the interrupt input signal from 61 is not passed through any voter, taking into consideration the failure of the interrupt control circuits 62 and for the purpose of circuit simplification as well.

(3) Control Lines (Microprocessor Outputs) 21

Many control signals are actually outputted from the microprocessors, but for the sake of simplicity only three signal lines, i.e., read/write, data-strobe and bus-lock signal lines are illustrated as connected to a voter 31. Since the control lines 21 of the microprocessors are driven in asynchronism with one another, outputs of the microprocessors are sent directly to the voter 31 without addition of associated error correcting codes. The voter 31 takes a vote on each of the control signals, but the failure of the voter 31 can be avoided because of its redundancy arrangement. In FIG. 9, the control signal voter 31 is integrally illustrated, but it has a redundancy arrangement as mentioned above and its faulty part can be separated therefrom.

(4) Addeess Signal lines (Microprocessor outputs) 22

Each of the address signal output lines 22 connected to the microprocessors contains 26 signal wires, and the signals carried on which are subjected to an error correcting code encoding in associated one of error correcting code encoders (ECC-ENC's) 24. These control signals with addition of the error correcting codes are voted at a voter 32 on a bit-by-bit basis to eliminate the failure of the microprocessors 11 and ECC-ENC's 24, and then sent to memories 12 and system buses 43. The memories 12 and I/O devices 51 connected through associated ECC DEC/ENC's 41 to associated system bus interfaces 42 can obtain correct address values, since the ECC DEC's 41 eliminate the errors of the voter 32 and system buses 43.

(5) Data Signal Lines 23

Since the data signal lines 23 are of a two-way type, there are two cases where data are sent from the microprocessors 11 onto the data signal lines and conversely data are sent from the data signal lines to the microprocessors 11. When data are outputted from the microprocessors 11 to be written in the memories 12 and I/O devices 51, correct data are transferred to the memories 12 and I/O devices 51 respectively through ECC ENC-/DEC's 25, a voter 33 and write controls 82 and through ECC ENC/DEC's 25, a voter 33 and ECC DEC/ENC's 41. Conversely, when data is to be inputted into the microprocessors 11 for reading, the input data are subjected to an error correcting code encoding at the I/O devices 51, memories 12, ECC DEC/ENC's 41 or write control's 82 and then applied to the voter 33. In this case, the voter 33 does not perform any voting operation and has only a function of distributing the data to the respective microprocessors 11. Output data of the voter 33 are subjected at ECC ENC/DEC's 25 to correction of errors generated on the way and then applied to the microprocessors 11 so that the microprocessors 11 can accept correct data.

Figure 10:
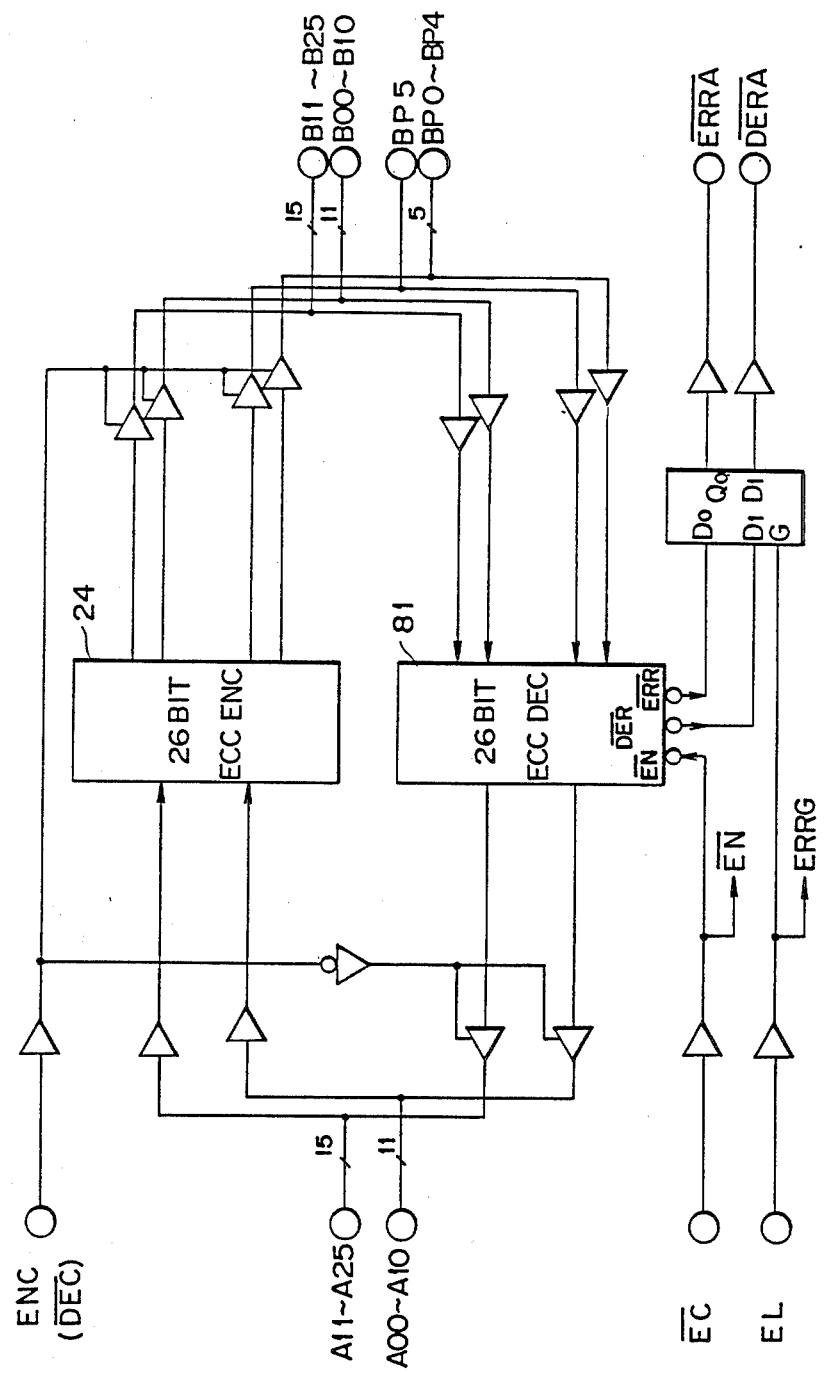
FIGS. 10 and 11 show detailed circuit diagrams of a 26-bit ECC ENC circuit in FIG. 9 and a 16-bit ECC ENC/DEC circuit, respectively.

FIG. 10 shows details of the 26-bit ECC ENC circuit 24 and the 26-bit ECC DEC circuit 81 for address signal shown in FIG. 9. The circuit of FIG. 10 includes both the encoder 24 and decoder 81 which can be selectively used as an encoder or a decoder according to the setting of a terminal ENC. When it is used as an encoder, address signals are applied from the microprocessors 11 to terminals A00 to A25 to be encoded by the 26-bit ECC ENC, thus obtaining the address signals subjected to error correcting code encoding at terminals B00 and B25 and BP0 to BP5.

Figure 12:
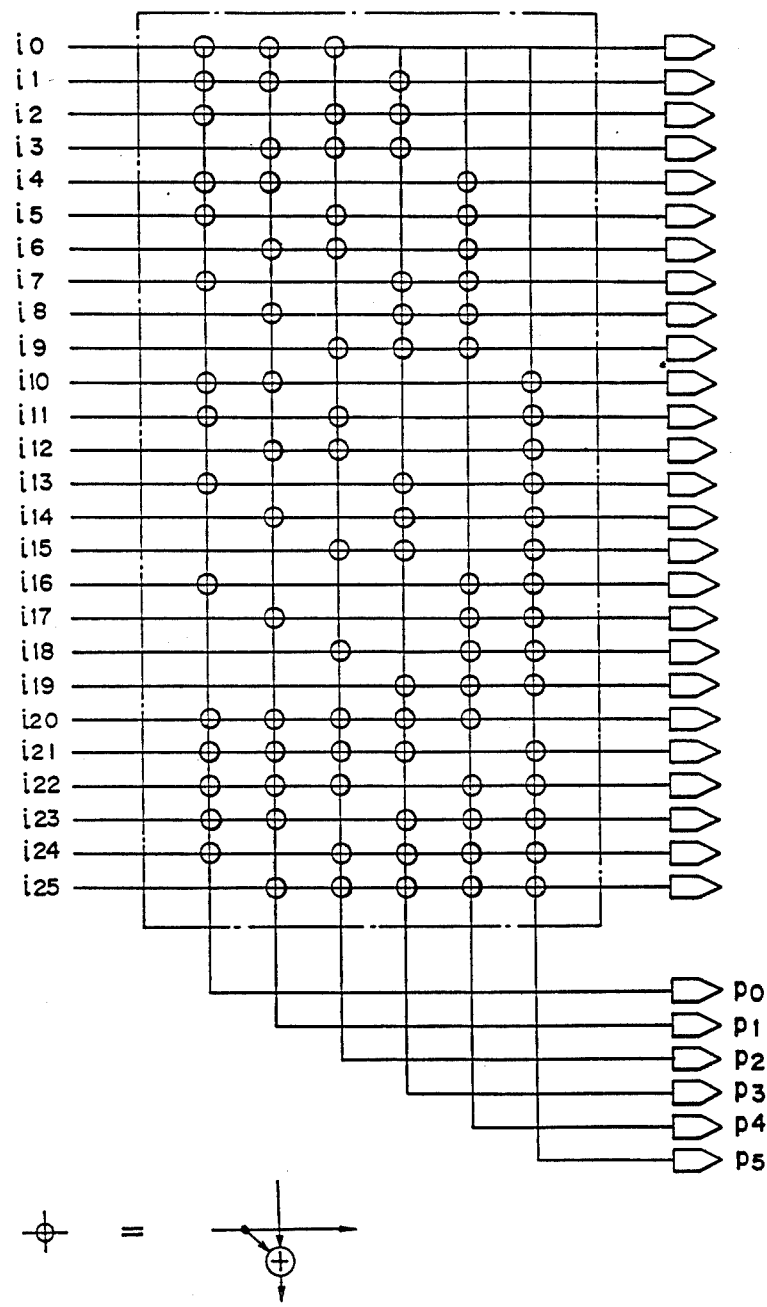
FIGS. 12 and 13 are circuit diagrams showing interior arrangements of 26-bit ECC ENC circuit and 26-bit ECC DEC circuit in FIG. 10, respectively.

FIG. 12 shows an example of the arrangement of the 26-bit ECC ENC circuit in which single error correcting and double error detecting codes (SEC-DED codes) are used.

On the other hand, when it is used as a decoder, address signals subjected to error correcting code encoding are applied to the terminals B00 and B25 and BP0 to BP5 to be decoded by the 26-bit ECC DEC circuit, whereby correct address signals may be obtained at the terminals A00 to A25.

If there is an error in the input signals and the error is a single error (the result is corrected), a signal appears at a terminal $\overline{ERRA}$; while if there are multiple errors (the result is not correct, either), a signal appears at a terminal $\overline{DERA}$. And when all the input signals are correct, no signal appears at the terminal $\overline{ERRA}$ and at the terminal $\overline{DERA}$. As a result, the state of the error can be known.

Figure 13:
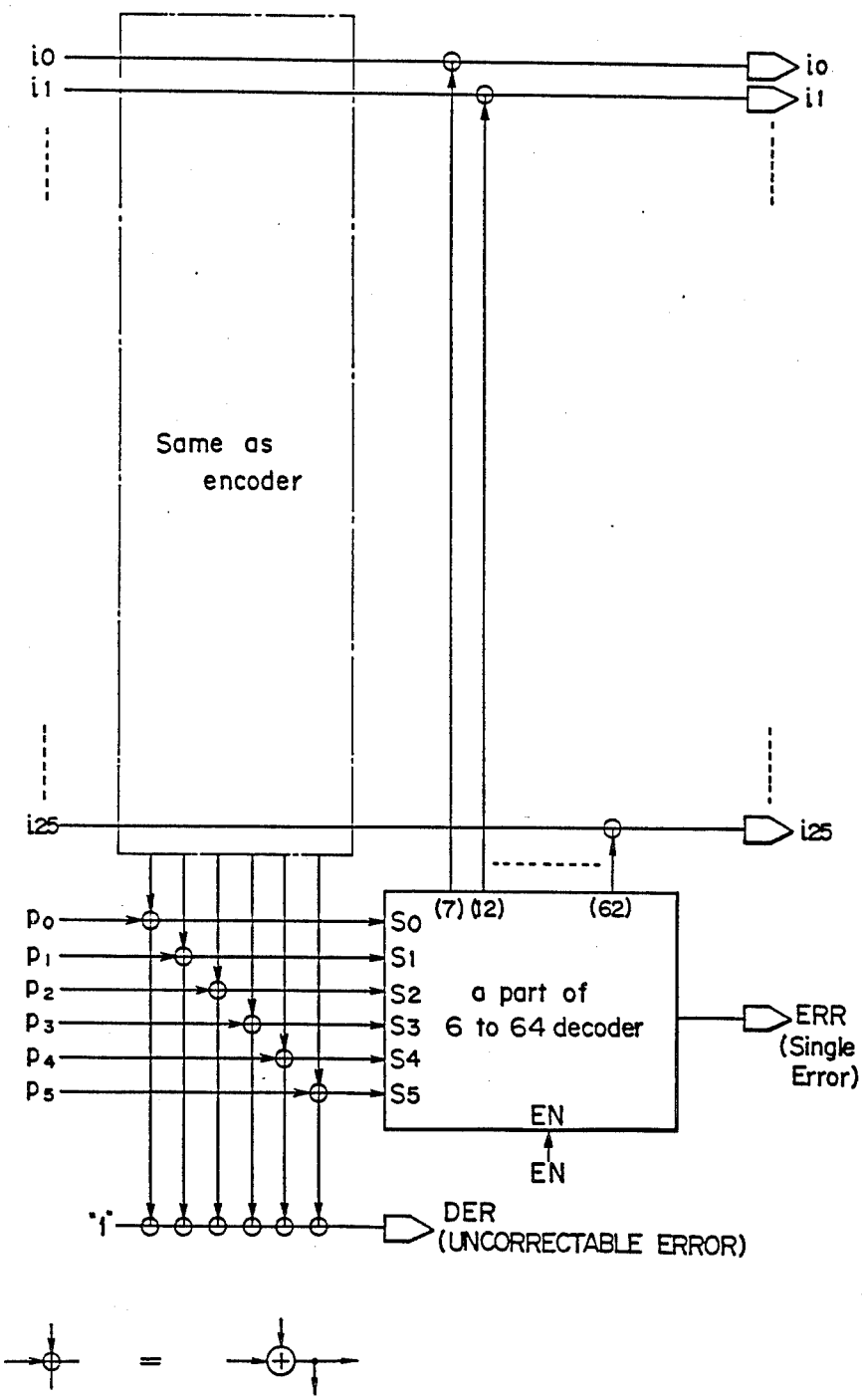

FIG. 13 shows an example of the arrangement of the 26-bit ECC DEC circuit which uses the SEC-DED codes, while FIG. 14 shows a syndrome matrix logic table on the codes.

Figure 11:
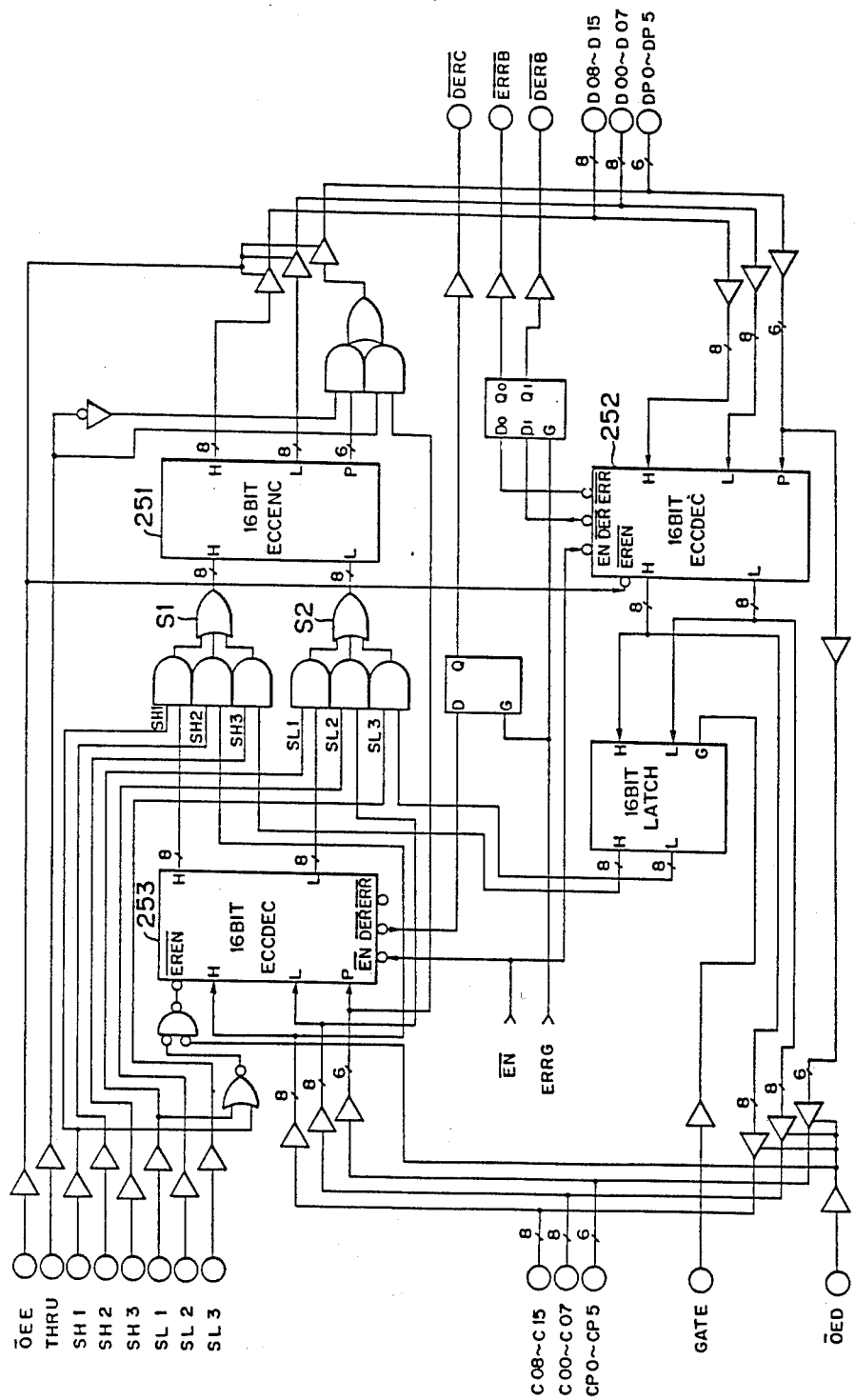

FIG. 11 shows details of the 16-bit ECC ENC/DEC circuits 25 and write controls 82 for data signal shown in FIG. 9. The circuit of FIG. 11 has a byte processing function in addition to the 16-bit ECC encoding and decoding function. When the ECC ENC/DEC circuits 25 are used as connected to the microprocessors 11, terminals C00 to C15 are connected to the microprocessors 11 while terminals D00 to D15 and DP0 to DP5 are connected to the voter 33. Assume now that $SH_2=SL_2=1$ and $SL_1=SL_3=SH_1=SH_3=0$, THRU=0. When the microprocessors 11 issue data, such data are supplied to the terminals C00 to C15. Since $SH_2$ and $SL_2$ are both 1, switches S1 and S2 select terminals C00 to C15 as their outputs which are subjected at a 16-bit ECC ENC 251 to error correcting code encoding and then sent onto the terminals D00 to D15 and DP0 to DP5.

When the microprocessors 11 are used to read data, the data subjected to error correcting code encoding are conversely applied to the terminals D00 and D15 and DP0 to DP5, subjected to error correction at a 16 bit ECC DEC 252, sent onto the terminals C00 to C15, and then read by the microprocessors 11.

At the time of error generation, the error state can be known from the absence or presence of signals at terminals $\overline{ERRB}$ and $\overline{DERB}$, as in the 26-bit ECC ENC/DEC's 24 and 81 shown in FIG. 10.

When the ECC ENC/DEC circuits 41 are used as connected to such input/output circuits as input/output devices 51 or the like, this is equivalent to the case where the microprocessors 11 are replaced by the input/output devices 51.

When the write control circuits 82 are used as connected to the memories 12, the terminals C00 to C15 and CP0 to CP5 are connected to the voter 33 while the terminals D00 to D15 and DP0 to DP5 are connected to the memories 12. In the usual 16-bit write mode, ECC-added data applied to the terminals C00 to C15 and CP0 to CP5 are once subjected at a 16 bit ECC DEC circuit 253 to error correction, again subjected at the 16-bit ENC circuit 251 to error correcting code encoding, sent to the terminals D00 to D15 and DP0 to DP5, and written in the memories 12 ($SH_1=SL_1=1$, $SH_{2\sim3}=SL_{2\sim3}=0$, THRU=0). When $SH_2=SL_2=1$, $SH_{1\sim3}=SL_{1\sim3}=0$ and THRU=1, input data subjected to no error correction can be written in the memories.

In the 16-bit read mode, when data read out of the memories 12 are applied to the terminals D00 to D15 and DP0 to DP5, the data are once subjected at the 16 bit ECC DEC circuit 252 to error correction, sent to the terminals C00 to C15 and CP0 to CP5 and then to the voter 33.

In the one byte or 8-bit read mode, as in the 16-bit read mode, 16 bit data are read out from the memories 12, and sent through the voter 33 to the ECC ENC/DEC's 25 provided on the input side of the microprocessors 11 to be processed on a 16 bit basis up to the ECC ENC/DE's, and then necessary high or low byte of the 16-bit data is read by the microprocessors 11.

In the one byte or 8-bit write mode, 8-bit data issued from the microprocessors 11 are sent to the ECC ENC circuit 251 so that the switches S1 and S2 set bits other than the 8 bits of the output data of the microprocessors 11 at "0" to generate a 16-bit data to which an error correcting code (ECC) is added. The ECC-added 16-bit data are voted by the voter 33 and then sent to the memory write control circuits 82 in which the 16 bit ECC decoder 253 in FIG. 11 performs error correction over the received data and sends the data to the switches S1 and S2.

In the byte write operation to the memories, those output data which are not to be written by the microprocessor 11 must be read out from the memories 12. Accordingly, all the data are once read out and sent to the terminals D00 to D15 and DP0 to DP5, subjected at the 16-bit ECC DEC 252 to error correction, and then sent to the switches S1 and S2. The switches S1 and S2 combine the byte data sent from the microprocessors 11 and the byte data read out from the memories 12 to prepare new 16-bit data to be written in the memories 12. The new data are subjected at the 16-bit ECC ENC 251 to ECC addition, sent to the terminals D00 to D15 and DP0 to DP5, and then written in the memories 12.

Figure 15:
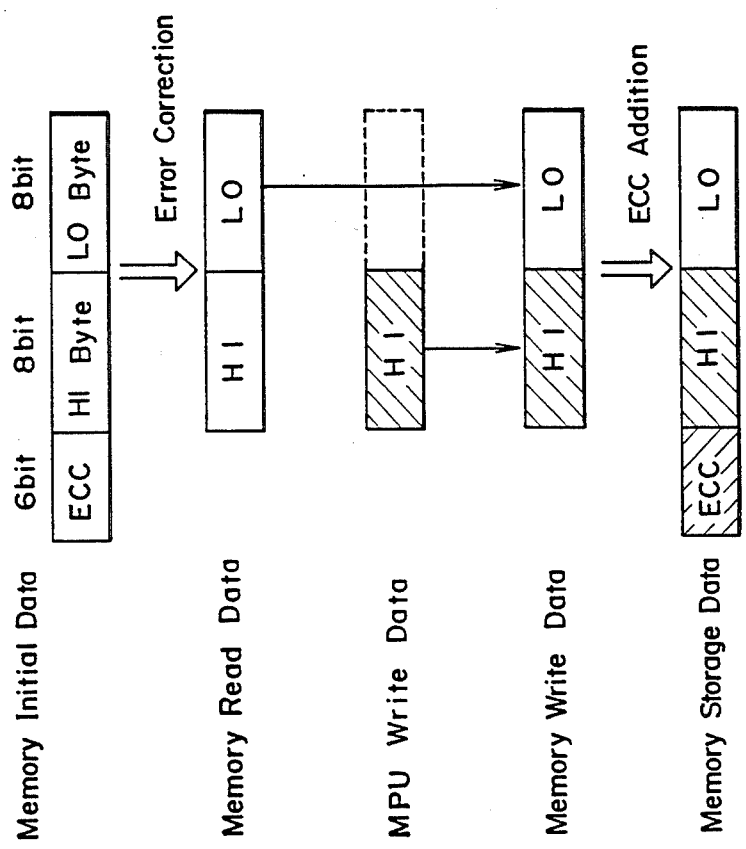
FIG. 15 is a flow chart showing the byte write processing by the 16-bit ECC ENC/DEC circuit of FIG. 11.

The data flow in this byte writing system is shown in FIG. 15. In this byte writing system, data are first read out from the memories on a word-by-word basis, and write information sent from the microprocessors 11 is added thereto to prepare memory writing data, and then the memory writing data are again subjected to ECC addition and written in the memories 12. Therefore, one writing operation requires two memory cycles but it requires the ECC to be made up of only 6 bits. Employment of a system of adding the ECC to every byte requires the ECC to be made up of 10 (5 bits×2) and thus the system shown in FIG. 15 is advantageous because it requires a lesser number of memory elements.

The 16 bit ECC ENC circuit 251 and 16 bit ECC DEC circuits 252 and 253 correspond to parts of the 26 bit ECC ENC circuits 24 and 26 bit ECC DEC circuits 81, that is, the formers use only 16 bits out of 26 bits with the remaining 10 bits being set to be all "0".

Figure 16:
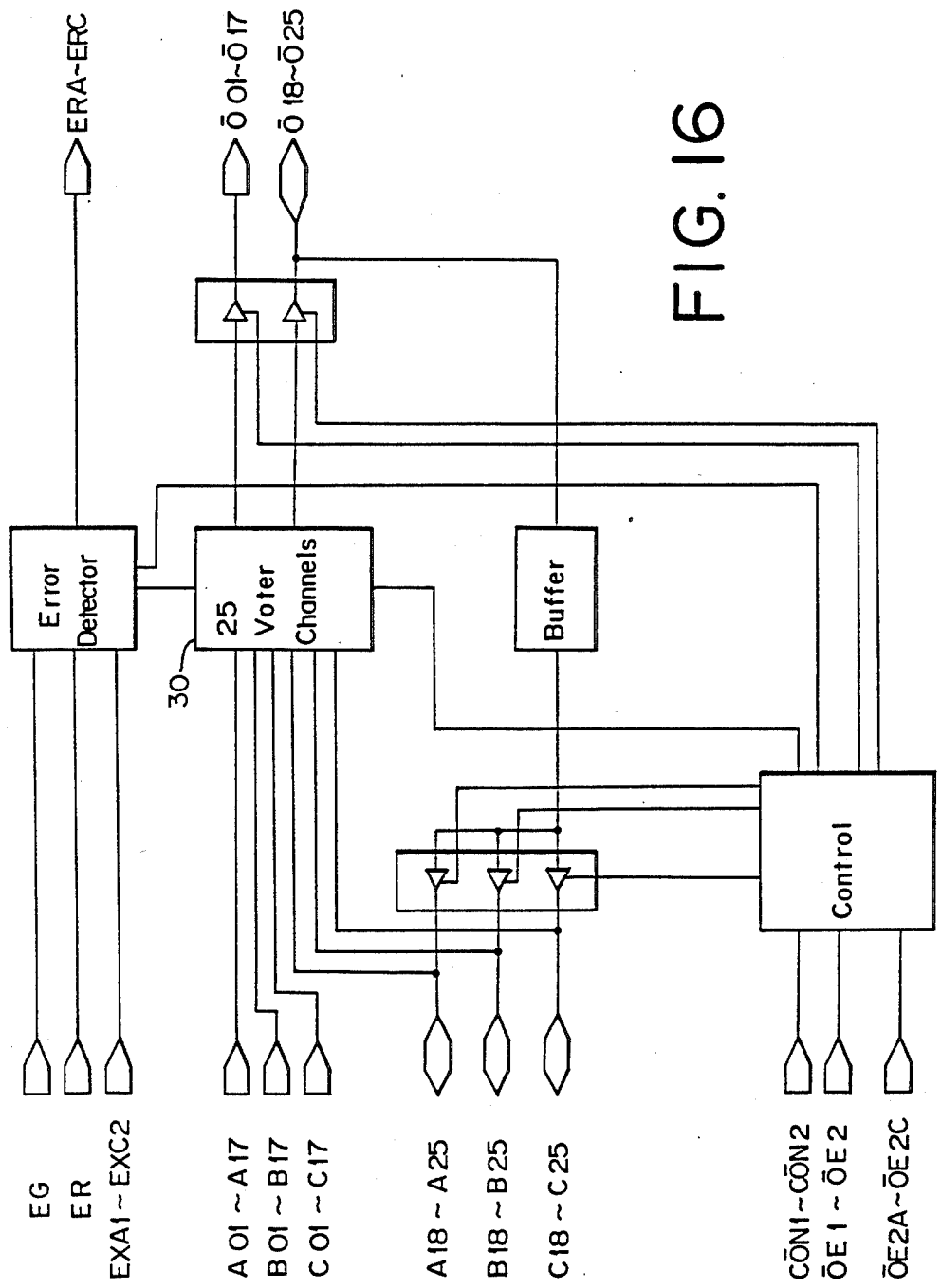
FIG. 16 is a circuit diagram showing an interior arrangement of a voter in FIG. 9.

Details of the voter circuits 31, 32 and 33 shown in FIG. 9 are shown in FIG. 16. The voter circuits shown in FIG. 16 comprise 25 voting channels 30 to take a vote on three data systems A to C. As a result of taking a vote on the data systems A to C, when any one of the systems A to C is wrong, the voter circuit of FIG. 16 can show the wrong system with use of the flags of ERA to ERC. When two of the voting input systems A to C are completely faulty, the voter circuit of FIG. 16 cannot perform its voting function. Therefore, the voter circuit is arranged to be able to also use only one of the systems A to C, taking into consideration such situations as the above two-faulty-system case or easiness in a test.

The voting channel circuit 30 of FIG. 16 has a total of 25 channels consisting of 17 one-way channels and 8 two-way channels and can play roles of the three voters 31, 32 and 33 in FIG. 9. The 17 one way channels consist of 6 control channels (3 control line channels×2) and 11 address chennels, while the 8 two-way channels are used as data lines.

Figure 17:
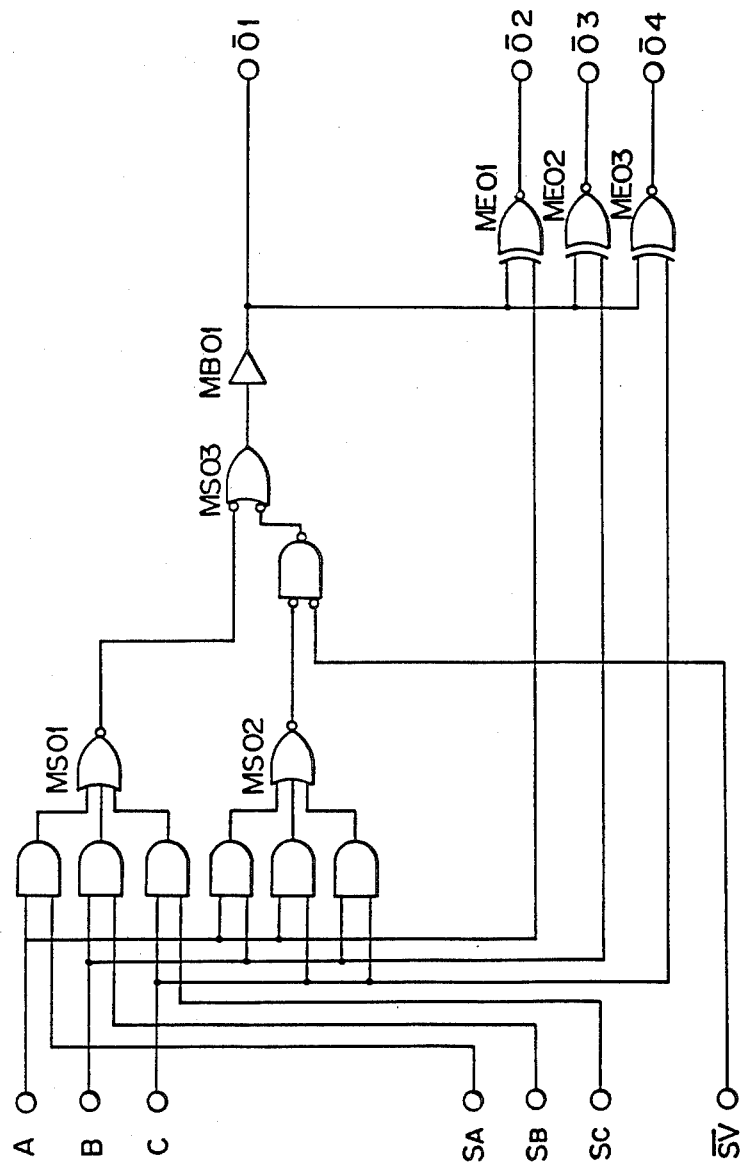
FIG. 17 is a circuit diagram showing an interior arrangement in one of the channels of the voter in FIG. 16.

FIG. 17 shows details of one of the 25 channels of the voting channel circuit 30 in FIG. 16. In FIG. 17, symbols A, B and C represent data inputs respectively, $\overline{O1}$ the output of the voting result, $\overline{O2}$, $\overline{O3}$ and $\overline{O4}$ flag outputs indicative of errors with respect to the data inputs A to C respectively. Symbol $\overline{SV}$ indicates a selective mode control signal for stopping the voting operation in cooperation with signals $S_A$, $S_B$ and $S_C$ and selecting one of the systems A to C, in which selected mode the signal $S_A$, $S_B$ or $S_C$ indicates selected one of the systems A to C, whereby the selected channel produces an output of $\overline{O1}$.

As has been described in the foregoing, according to the present invention, there is provided a high-reliability computer system comprising error correcting code encoders for adding error correcting codes to outputs of computers and an error correcting code decoder for correcting an error in a voter based on said error correcting codes, whereby means for avoiding failures in constituent elements of the computer system are provided all as constituent elements of the system. As a result, the present invention can eliminate the need for such operation as change-over operation of a circuit in case of a failure and can advantageously remove automatically the influence of a failure which has occurred in one of the constituent elements of the computer system.

In this way, in accordance with the present invention, a very high reliability computer system can be obtained that avoids the disadvantages associated with the prior art voters, and its effect is great.

I claim:

1. A high-reliability computer system, comprising:
 a plurality of computers with respective outputs;
 a plurality of error correcting code encoders connected to said plurality of computers for adding error correcting codes to said respective outputs;
 a voter connected to said plurality of error correcting code encoders which receives the outputs of said computers encoded with said error correcting codes, and which produces an output in agreement with a majority of the encoded outputs of said plurality of computers; and
 an error correcting code decoder connected to the output of the voter for detecting and correcting an error in the output of the voter by decoding the error correcting code added by the error correcting code encoders.

2. A system according to claim 1, wherein said error correcting code decoder has a redundancy arrangement.

3. A system according to claim 1, wherein each of said computers has a memory disposed therein.

4. A system according to claim 1, wherein a memory is provided between the output of said voter and said error correcting code decoder.

5. A system according to claim 1, wherein said error correcting code encoders have an additional error correcting code decoder and said error correcting code decoder has additional error correcting code encoders to provide a two-way input/output arrangement to said system.

6. A system according to claim 5, wherein both said error correcting code decoder having an additional error correcting code encoder and an input/output device connected thereto have a redundancy arrangement.

7. A system according to claim 4, wherein an additional error correcting code decoder is provided immediately upstream of said memory.

8. A system according to claim 7, wherein said memory having an additional error correcting code decoder has a redundancy arrangement.

9. A system according to claim 5, wherein correction of control and address signals are made in one way corresponding to an output direction from said computers and correction of data signals is made in two ways corresponding to bidirectional flow necessary in read and write modes.

* * * * *